(12) United States Patent
Takakuwa et al.

(10) Patent No.: US 6,280,660 B1
(45) Date of Patent: Aug. 28, 2001

(54) METHOD AND APPARATUS FOR MANUFACTURING OPTICAL RECORDING MEDIUM

(75) Inventors: Atsushi Takakuwa; Takao Nishikawa, both of Shiojiri (JP); Satoshi Nebashi, Cambridge (GB)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/284,936

(22) PCT Filed: Aug. 21, 1998

(86) PCT No.: PCT/JP98/03722

§ 371 Date: Jun. 24, 1999

§ 102(e) Date: Jun. 24, 1999

(87) PCT Pub. No.: WO99/10154

PCT Pub. Date: Mar. 4, 1999

(30) Foreign Application Priority Data

May 25, 1997 (JP) .................................... 9-228281

(51) Int. Cl.$^7$ ..................................................... B29D 11/00
(52) U.S. Cl. .................. 264/1.33; 156/275.5; 156/379.6; 264/1.38; 264/40.5; 425/125; 425/149; 425/810
(58) Field of Search .................... 264/1.33, 106, 264/107, 1.38, 40.5; 425/810, 125, 149, 174.4; 156/275.5, 379.6, 381, 382

(56) References Cited

U.S. PATENT DOCUMENTS 4,492,967 * 1/1985 Broer et al. .

FOREIGN PATENT DOCUMENTS

| | | | |
|---|---|---|---|
| 2 040 787 * | 9/1980 | (GB) | ................................... 264/107 |
| 57-66914 | 4/1982 | (JP) . | |
| 59-101322 | 6/1984 | (JP) . | |
| 61-244513 | 10/1986 | (JP) . | |
| 63-11317 | 1/1988 | (JP) . | |
| 53-86756 | 7/1989 | (JP) . | |
| 2-24848 | 1/1990 | (JP) . | |
| 4-138233 | 5/1992 | (JP) . | |
| 4-229430 | 8/1992 | (JP) . | |
| 5-62254 | 3/1993 | (JP) . | |
| 9-63133 | 3/1997 | (JP) . | |

* cited by examiner

*Primary Examiner*—Mathieu D. Vargot
(74) *Attorney, Agent, or Firm*—Harness, Dickey & Pierce, P.L.C.

(57) ABSTRACT

In an optical recording medium manufacturing method for forming an optical recording medium by hardening photo curing resin between a resin plate (11) and a template in order to provide a technique for manufacturing an optical recording medium that has excellent optical properties and that is not apt to undergo failure during production, the resin plate (11) is produced by a heating step (104) for heating thermoplastic resin (10) to a predetermined temperature to be melted, a feeding step (103, 105) for feeding the melted thermoplastic resin (10) into a mold (1), and a molding step (101, 102) for molding the thermoplastic resin (10), which has been fed into the mold (1), into the resin plate (11) by compression. Since molding is performed by the mold in a low-pressure and low-temperature environment, it is possible to prevent deterioration due to oxidation, and molding strains.

16 Claims, 6 Drawing Sheets

METHOD AND APPARATUS FOR MANUFACTURING OPTICAL RECORDING MEDIUM

TECHNICAL FIELD

The present invention relates to a technique for manufacturing an optical recording medium having an uneven pattern formed on the surface thereof. More particularly, the present invention provides a new method of producing a flat substrate to be used in manufacturing an optical recording medium by photopolymerization.

BACKGROUND ART

As a typical method of manufacturing an optical recording medium, i.e., an optical disk, photopolymerization has been used hitherto. Photopolymerization is a method in which a flat plate of plastic, glass, or the like (referred to as a "flat substrate") is prepared, a photo curing resin, which is hardened by light energy such as ultraviolet rays, is filled between the flat substrate and a stamper, and the photocuring resin is hardened by irradiation with ultraviolet rays.

A conventional photopolymerization method is disclosed in, for example, Japanese Unexamined Patent Publication No. 53-86756. This publication describes a method in which a master (the "master" corresponds to a stamper hereinafter in this description) is formed of nickel by electroforming, and a pattern is transferred from the master onto a flat substrate made of polymethyl methacrylate, polycarbonate, or the like, by using an ultraviolet-curing resin.

Japanese Unexamined Patent Publication No. 5-62254 discloses a method in which silicon is used as a master, and a pattern is transferred from the master of a silicon wafer, which has an uneven pattern formed by etching, onto a flat substrate by using an ultraviolet-curing resin.

In the above conventional photopolymerization methods, a resin plate formed of polycarbonate by injection molding or extrusion is used as the flat substrate in order to improve mass productivity.

Since polycarbonate has a considerably strong optical anisotropy, however, the optical properties of a disk, which is obtained by working a sheet material formed by extrusion, vary depending on the reading direction of a pickup. In order to obtain stable reproduced signals, it is necessary that the optical properties not vary even when the reading direction of the pickup changes somewhat. Consequently, it is impossible to use polycarbonate as a material for the optical disk.

In contrast, when acrylic having a weak optical anisotropy is used instead of polycarbonate, the optical properties of a disk obtained by extrusion and working described above are improved. Acrylic is, however, highly hygroscopic, and thereby tends to cause deformation, such as warping of a disk. Moreover, when a reflecting film, a recording film, or the like is formed on the disk surface by vacuum forming, it takes substantial time to remove gas (in particular, moisture) from the disk.

In order to solve the above problems, it is preferable to use a polyolefin copolymer as a material for a resin plate that satisfies the requirements of desirable optical anisotropy, constant low hygroscopicity, and resistance to deformation. Even when polyolefin is used, however, as long as a resin plate is formed by injection molding, the following problems may arise. Therefore, it is necessary to suggest a new method of producing a resin plate. First, when polyolefin is heated to a high temperature for injection molding and is injected into a mold at a high pressure, decomposition or oxidation sometimes occurs, thereby deteriorating the properties of the optical disk. Furthermore, in injection molding, the resin plate sometimes deforms due to changes in pressure in the process of reducing the pressure immediately after molding. Moreover, in injection molding, after resin is heated to a high temperature to be melted, waiting is necessary for the resin to become sufficiently cooled. This may prolong production time, and increase production cost.

SUMMARY OF THE INVENTION

In view of the above problems, a first object of the present invention is to provide a technique for manufacturing an optical recording medium that has excellent optical properties and that is not apt to undergo failure during production.

A second object of the present invention is to provide an optical recording medium manufacturing technique in which the properties can be prevented from deteriorating due to oxidation of a resin plate.

A third object of the present invention is to provide an optical recording medium manufacturing technique in which deformation of a resin plate after molding is restricted.

A fourth object of the present invention is to provide an optical recording medium manufacturing technique that allows reduction in the time spent until a resin plate is molded.

The present invention achieves the above first object, and provides an optical recording medium manufacturing method for forming an optical recording medium by hardening a hardening resin between a resin plate and a template, wherein the resin plate is produced by a heating step for heating thermoplastic resin to a predetermined temperature to be melted; a feeding step for feeding the melted thermoplastic resin into a mold; and a molding step for compression-molding, into a resin plate, the thermoplastic resin fed into the mold. Preferably, the thermoplastic resin is a resin mainly containing a polyolefin copolymer.

The present invention achieves the above second object, in which the thermoplastic resin is compressed in the molding step below the temperature at which the thermoplastic resin undergoes oxidation.

The present invention achieves the above third object, in which the thermoplastic resin is compressed in the molding step at a pressure lower than the pressure at which the resin plate deforms due to reduction in pressure against the resin plate after molding.

The present invention achieves the above fourth object, and the method further includes a cooling step for cooling the molded resin plate after the resin plate is removed from the mold and transferred to another mold.

The method of the present invention further includes a mold switching step for accelerating the cooling of the resin plate by replacing a part of the mold with another mold after the resin plate is molded.

The present invention achieves the above first object, and provides an optical recording medium manufacturing apparatus for forming an optical recording medium by hardening a hardening resin between a resin plate and a template, which apparatus includes a mold structured so as to compression-mold thermoplastic resin fed into a cavity; a thermoplastic resin supplying mechanism for feeding thermoplastic resin into the cavity in the mold; and a hardening resin bonding apparatus for manufacturing an optical recording medium by putting melted hardening resin between a resin plate produced by compressing the thermoplastic resin by the mold and the template having a predetermined uneven pattern, and by hardening the hardening resin.

According to the present invention, the optical recording medium manufacturing apparatus includes a mold switching mechanism for replacing a part of the mold with another mold after the resin plate is molded, thereby accelerating the cooling of the resin plate.

According to the present invention, the optical recording medium manufacturing apparatus includes a plurality of molds, (a) a connecting mechanism structured to connect these molds and the thermoplastic resin supplying mechanism, (b) a mold switching mechanism for replacing a part of the mold with another mold, and (c) a removing mechanism for removing the resin plate from the mold whose part is replaced by another mold.

The connecting mechanism connects the thermoplastic resin supplying mechanism to the mold for producing a resin plate, and disconnects the mold and the thermoplastic resin supplying mechanism after the resin plate is molded in the mold.

The mold switching mechanism replaces a part of the mold with another mold after the resin plate is molded.

After the molded resin plate is cooled in the mold whose part has been replaced, the removing mechanism removes the resin plate from the mold.

The present invention offers the following four advantages:

(1) By adopting polyolefin for a resin plate, and compression-molding the resin plate in the mold in a low-pressure and low-temperature environment during the production process, it is possible to provide a technique for manufacturing an optical recording medium that has excellent optical properties and that is not apt to undergo failure during production.

(2) By controlling the temperature of the resin to a fixed temperature or less during molding, it is possible to provide an optical recording medium manufacturing technique in which the properties can be prevented from deteriorating due to oxidation of the resin plate.

(3) Since the pressure to be applied to the resin during molding is controlled to a fixed pressure or less, it is possible to provide an optical recording medium manufacturing technique in which the deformation of the resin plate after molding is restricted.

(4) Since the resin plate does not require high precision and the molds are inexpensive, the resin plate can be cooled by using a plurality of molds. Therefore, it is possible to provide an optical recording medium manufacturing technique that is able to shorten the production time spent until a resin plate is molded, and to thereby reduce the production cost.

BEST MODES FOR CARRYING OUT THE INVENTION

Preferred modes of the present invention will be described below with reference to the drawings.

(First Mode)

Figure 1:
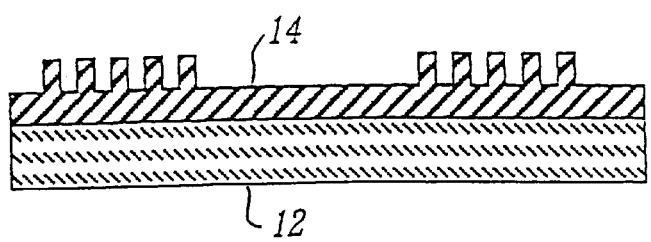
FIG. 1 is a cross-sectional view of an optical disk according to the present invention.

FIG. 1 is a cross-sectional view of an optical recording medium (optical disk) according to a first mode of the present invention.

While manufacture of a disklike optical recording medium, i.e., an optical disk, will be described in the first mode, the optical recording medium may have a shape other than that of a disk, and it may be shaped like a square or the like. Furthermore, the optical recording medium is not necessarily flat, but may also be curved.

The optical disk according to this mode is, as shown in FIG. 1, composed of a resin plate formed by working a material mainly containing a polyolefin polymer into the shape of a disk by a manufacturing method of the present invention, i.e., a flat substrate 12, and a photocuring resin layer 14 formed on the flat substrate 12 and having a pattern (e.g., pits and grooves) according to desired information formed thereon. A playback-only optical disk is manufactured by forming on the photocuring resin layer 14 a reflecting film, and a protective film for protecting the reflecting film, in that order. A rewritable magneto-optical disk is manufactured by forming on the photocuring resin layer 14 a protective film, a magneto-optical recording film, and a protective film, in that order.

The optical disk of this mode is manufactured by producing the flat substrate 12 formed of a resin plate in a substrate producing process, and bonding the photocuring resin layer 14 onto the flat substrate 12 in a bonding process.

(Substrate Producing Process)

Figure 2:
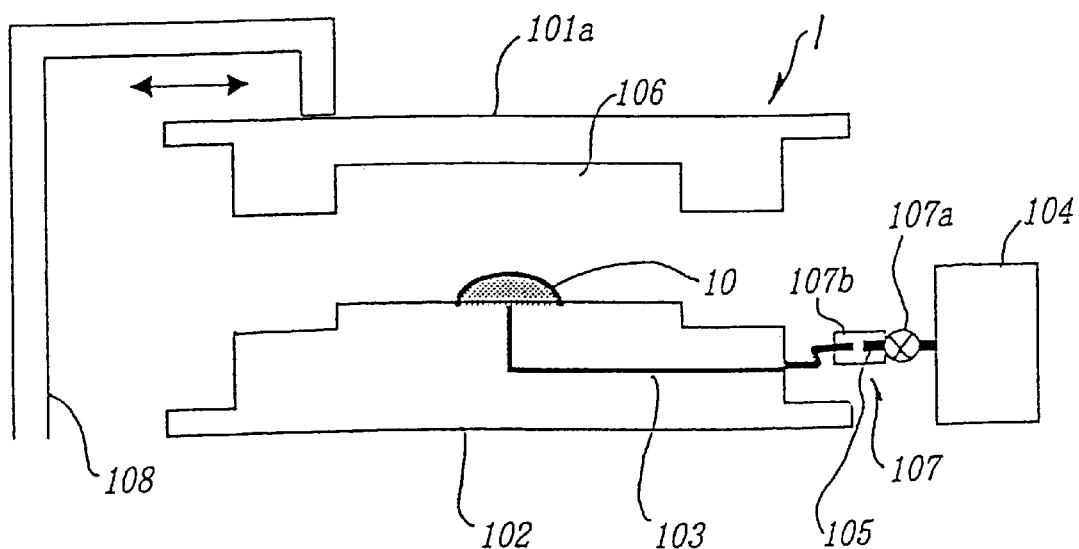
FIG. 2 is a structural view of a substrate producing apparatus according to a first mode.

FIG. 2 is a structural view of a production apparatus used in the substrate producing process. As shown in the figure, a production apparatus 1 for the substrate producing process comprises an upper mold 101, a lower mold 102, a resin heating and supplying device 104, a connecting mechanism 107, and a mold switching mechanism 108. The upper mold 101 includes two types of molds, a mold 101a used to shape a resin plate, and a mold 101b used to cool the shaped resin plate, which can be interchanged by the mold switching mechanism 108. The upper mold 101 is shaped to engage with the lower mold 102 so as to form a cavity 106 serving as a space in a fixed shape. This cavity 106 is formed in the shape of the resin plate, i.e., the disk shape of the optical disk. The lower mold 102 is engaged with the upper mold 101 to form the cavity 106, as described above. On the bottom face of the cavity, an opening of a feed pipe 103 is open so that resin supplied from the resin heating and supplying device 104 can be fed into the cavity 106 via the feed pipe 103. The resin heating and supplying device 104 melts resin, e.g., a thermoplastic resin, by raising the temperature, and feeds the melted resin from the feed pipe 103 to the cavity via a pipe 105.

It is assumed that a polyolefin copolymer having thermoplasticity is used as the above resin. A polyolefin copolymer has weak optical anisotropy, and is excellent as a material for an optical recording medium.

The connecting mechanism 107 includes a valve 107a and a connecting portion 107b. The valve 107a allows the supply of resin to be stopped in order to disconnect the resin heating and supplying device 104 from the lower mold 102 after a resin plate is formed. The connecting portion 107b is able to connect or disconnect the pipe 105 extending from the resin heating and supplying device 104, and the feed pipe 103 extending from the lower mold 102.

The mold switching mechanism 108 has a structure so as to hold the upper mold 101 at the leading end thereof, and to convey the held upper mold 101. The mold switching mechanism 108 applies pressure to the resin by conveying downward the upper mold 101a for resin plate shaping during resin molding, removes the upper mold 101a after resin plate shaping, and alternatively engages the cooling mold 101b again with the lower mold 102.

In the mold device 1 of the above-described substrate producing apparatus, a thermoplastic resin containing an amorphous polyolefin polymer is compressed.

Figure 3:
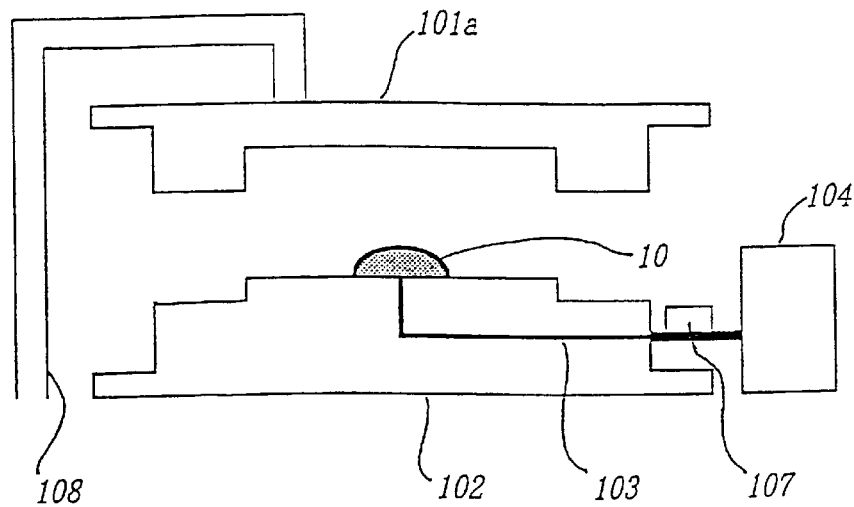
FIG. 3 is a diagram illustrating a heating step.

Heating Step (FIG. 3): First, the upper mold 101a is shifted up by the mold switching mechanism 108. The resin heating and supplying mechanism 104 and the lower mold 102 are connected by driving the connecting mechanism 107. Next, a molding material containing a polyolefin polymer is melted by the resin heating and supplying device 104. At this time, the melting temperature is controlled so that it does not exceed a fixed temperature. This is because polyolefin undergoes oxidation and the properties deteriorate if the temperature rises excessively. This temperature is, for example, 320 degrees or less.

Figure 4:
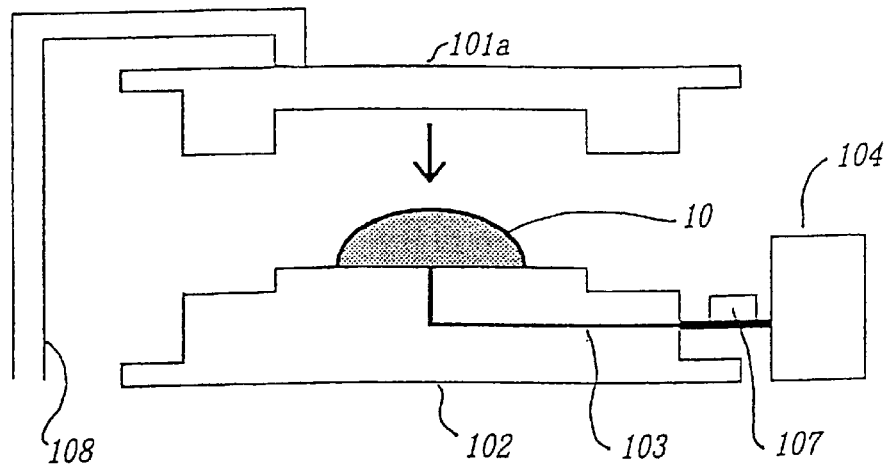
FIG. 4 is a diagram illustrating a resin supply step.

Resin Supply Step (FIG. 4): Melted resin 10 is supplied to the position on the lower mold 102 corresponding to the cavity 106 via the pipe 105 and the feed pipe 103. The amount of the resin 10 to be supplied is controlled to an amount that is substantially sufficient to produce one resin plate. When an appropriate amount of resin is supplied, the upper mold 101a is shifted down by the mold switching mechanism 108 to compress the resin 10.

On the other hand, the resin heating and supplying mechanism 104 is disconnected from the lower mold 102 by driving the connecting mechanism 107. The disconnected resin heating and supplying mechanism 104 is connected to another mold. Disconnection of the mold during cooling can reduce the production time.

Figure 5:
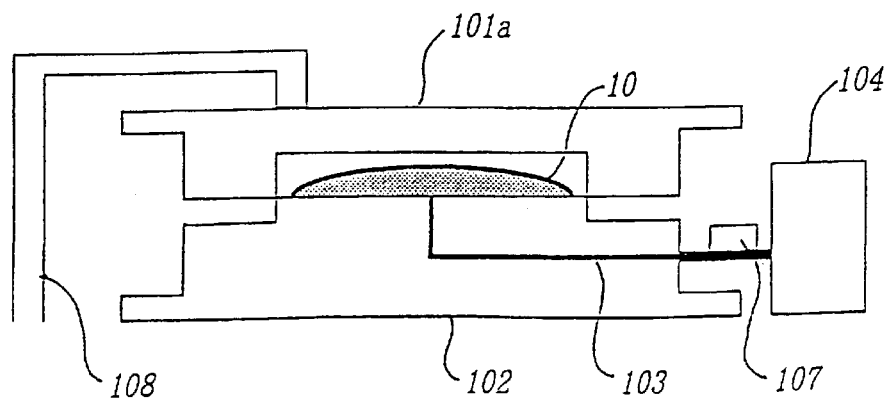
FIG. 5 is a diagram illustrating a molding step.
Figure 6:
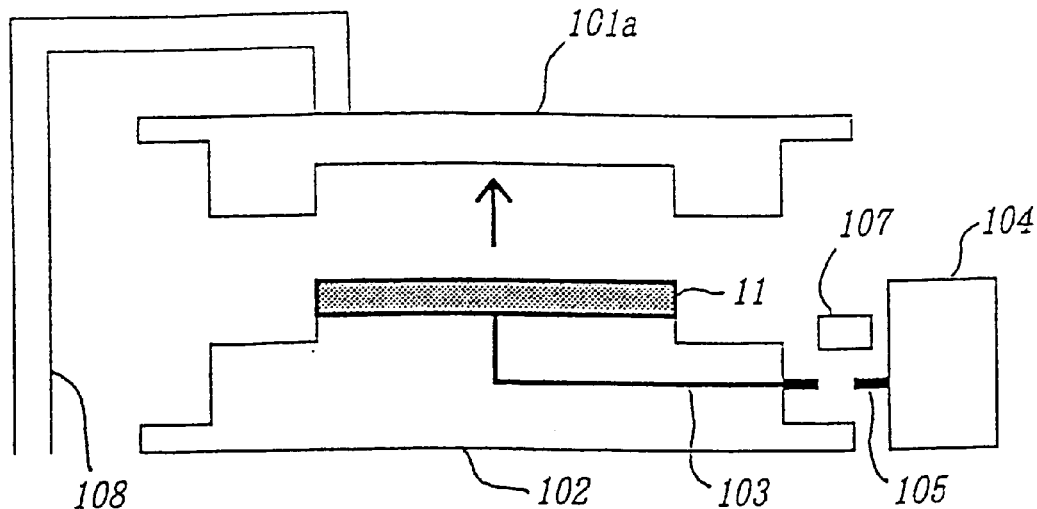
FIG. 6 is a diagram showing the state of resin after molding.

Molding Step (FIGS. 5 and 6): The upper mold 101 is engaged with the lower mold 102, so that the cavity 106 is formed and is filled with resin because of pressure. At this time, the pressure to be applied is controlled so that it does not exceed a fixed pressure. This is because deformation arises during decompression, as is seen in the case of injection molding, if the pressure increases excessively.

When the temperature of the resin 10 falls to approximately a temperature such that the resin 10 can maintain its shape, and the resin 10 is molded, the upper mold 101 is shifted up by the mold switching mechanism 108. A resin plate 11 is molded on the lower mold 102.

On the other hand, the resin heating and supplying device 104, which has completed the supplying of the resin 10, is detached from the lower mold 102 by driving the connecting mechanism 107. The detached resin heating and supplying device 104 is connected to another lower mold to be used again for resin supply.

Figure 7:
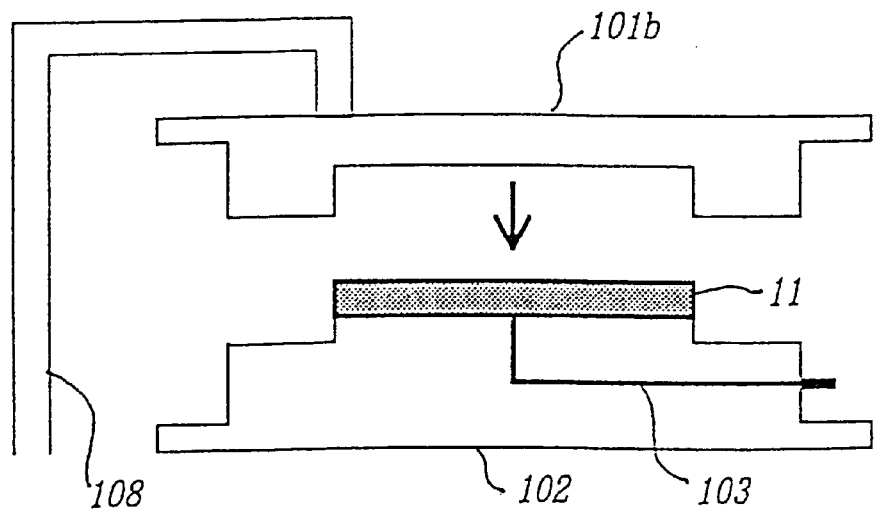
FIG. 7 is a diagram illustrating a cooling step.

Cooling Step (FIG. 7): Immediately after the upper mold 101 is drawn up, the resin plate 11 is at a high temperature and needs to be cooled further. Since rapid cooling causes deformation or the like, however, it is necessary to slowly cool the resin plate 11 over a predetermined time. In contrast, if the resin plate 11 is left in the mold to be cooled, the next resin molding is not allowed until the resin plate has cooled, which prolongs the production time.

Accordingly, in this mode, only the upper mold, which is a part of the mold, is replaced in order to efficiently cool the resin. The mold switching mechanism 108 conveys the upper mold 101a shifted up to another location, and alternatively holds and conveys the upper mold 101b for cooling above the lower mold 102. Then, the upper mold 101b is slowly moved onto the resin plate 11. The upper mold 101b and the lower mold 102 are thereby engaged to form the cavity 106, and waiting takes place for the resin plate 11 to be sufficiently cooled therein. Although the time necessary for cooling is much longer than the time for compression required during the compression process, it is possible to balance the manhours for the compression process with the manhours for the cooling process by providing a plurality of molds.

(Bonding Process)

Figure 8:
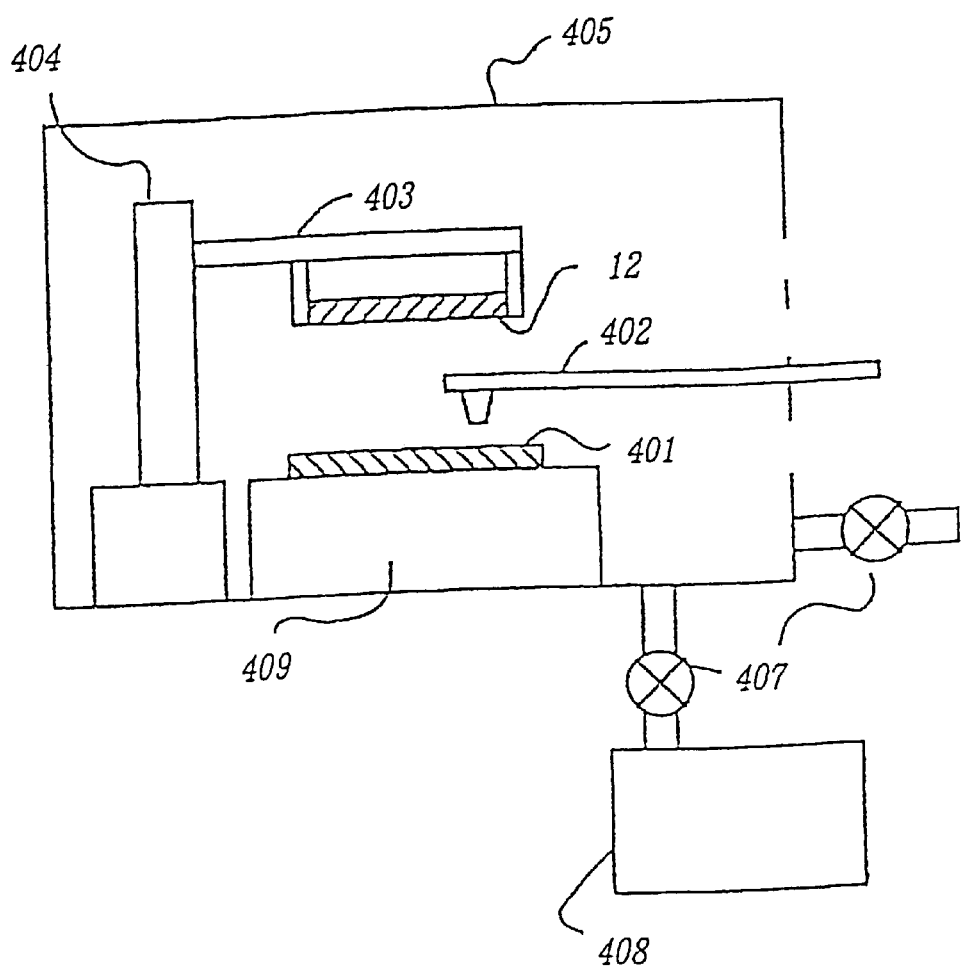
FIG. 8 is a structural view of a bonding apparatus of the present invention.

FIG. 8 shows an example of a bonding apparatus 4 for use in applying a photocuring resin onto an optical disk master and applying pressure thereto in this mode. This apparatus comprises a master holder 409 for bearing an optical disk master 401, a dispenser 402 for applying a photocuring resin onto the optical disk master 401 laid on the master holder 409, a substrate holding arm 403 for holding the flat substrate 12, which is produced by the substrate producing apparatus shown in FIG. 2, on the photocuring resin applied on the optical disk master 401, a substrate holding arm elevator 404 for moving the substrate holding arm 403 close to or apart from the optical disk master 401, a bonding chamber 405 for housing and hermetically sealing these devices, a vacuum pump 408 connected to the bonding chamber 405 to reduce the pressure inside the bonding chamber 405, and a valve 407 interposed between the bonding chamber 405 and the vacuum pump 408.

In this mode, the process for putting the flat substrate 12 on the optical disk master 401 is performed under a reduced pressure. By performing this process under a reduced pressure, it is possible to prevent air bubbles from being produced in the photocuring resin. Furthermore, by returning the pressure to a normal pressure after the flat substrate 12 is laid on the optical disk master 401, uniform pressurization by atmospheric pressure is possible, that is, the flat substrate 12 can be uniformly pressed against the photocuring resin.

Figure 9:
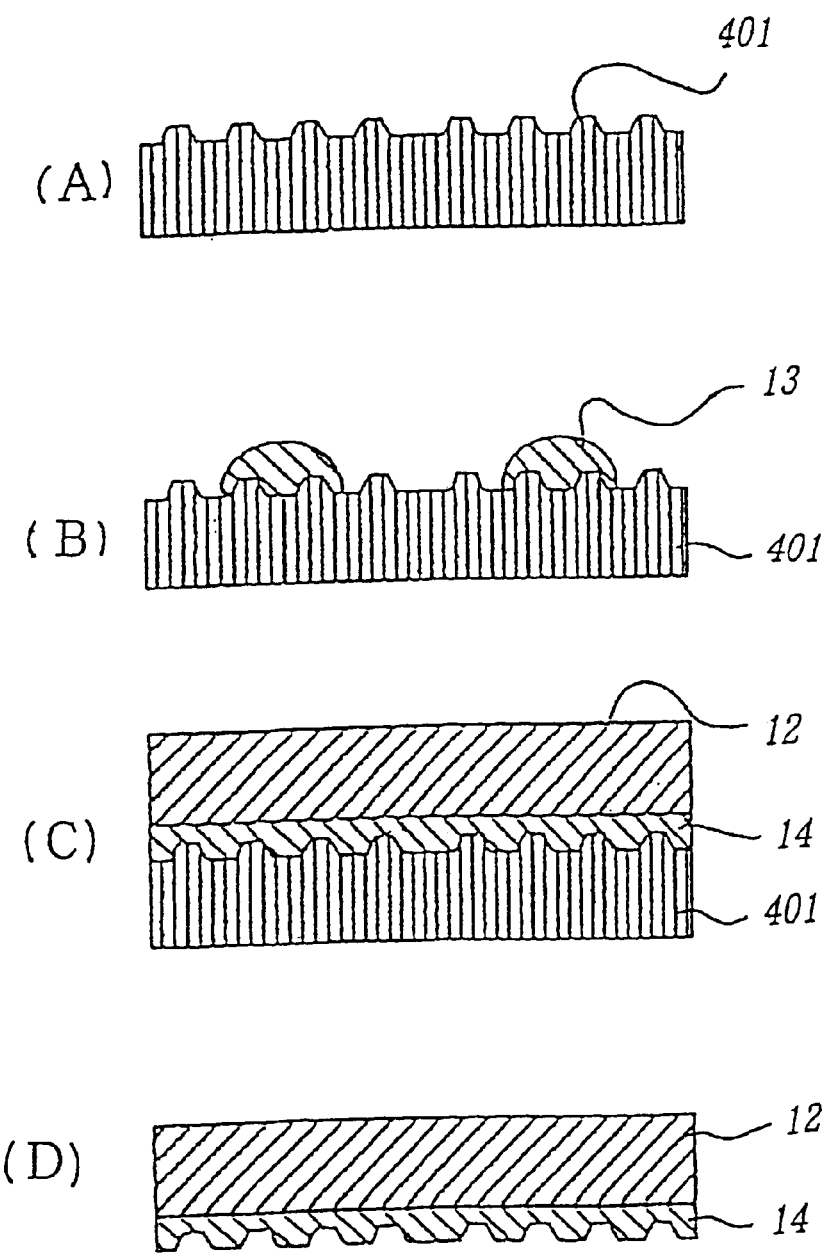
FIGS. 9A–9D are production-process cross-sectional views illustrating a bonding process.

While photocuring resin is applied onto the optical disk master in FIGS. 8 and 9, it may be applied onto the flat substrate. This case provides an advantage of ability to shorten the time in which the optical disk master is occupied during the process.

FIG. 9 is a production-process cross-sectional view illustrating the bonding process performed by the above-described bonding apparatus.

The produced flat substrate 12 is conveyed above the optical disk master 401 by the substrate holding arm 403 in the bonding apparatus.

The optical disk master 401 is a template having an uneven shape on its surface corresponding to predetermined information, as shown in FIG. 9(A).

In the next step shown in FIG. 9(B), a photocuring resin 13, which hardens by ultraviolet radiation, is applied onto the optical disk master 401 shown in FIG. 9(A).

In the next step shown in FIG. 9(C), the substrate holding arm 403 puts the flat substrate 12 produced by the mold device 1 and the cooling mold device 2 onto the photocuring resin 13 applied in the above step, and applies pressure thereto. By doing this, the photocuring resin 13 penetrates the entire uneven surface of the optical disk master 401, and the uneven shape of the optical disk master is accurately transferred onto the photocuring resin 13. Next, ultraviolet rays are radiated onto the photocuring resin 13 via the flat substrate 12 to harden the photocuring resin 13, whereby a photocuring resin layer 14 having the above uneven shape is formed on the flat substrate 12.

In the next step shown in FIG. 9(D), the photocuring resin layer 14 is stripped off the optical disk master 401, together with the flat substrate 12. In this way, a prototype of the optical disk is produced in which the photocuring resin layer 14 with a desired uneven pattern is formed on the flat substrate 12.

After stripping, an information recording face of the photocuring resin is subjected to desired steps, for example, of forming a reflecting film, and of forming a protective layer, thereby completing the optical disk.

According to this mode, since a polyolefin polymer is used for a flat substrate of an optical disk, it is possible to manufacture an optical disk having suitable optical properties of polyolefin. That is, since the optical anisotropy of polyolefin is weak, when the optical disk manufactured in this mode is played back, the level of reproduced signals will not vary depending on the reading direction of the pickup. This allows stable playback.

Furthermore, according to this mode, a molding method using a mold that can be performed at a low temperature is adopted, and the temperature during molding is controlled to a predetermined temperature or less. Consequently, there is a low risk that the properties will deteriorate due to oxidation of polyolefin as seen in injection molding.

Furthermore, according to this mode, a molding method using a mold that can be performed at a low pressure is adopted, and the pressure during molding is controlled to a predetermined pressure or less. Consequently, there is a low risk that the resin plate will be deformed as seen in injection molding.

Still furthermore, while the resin plate (flat substrate) produced in this mode is used for an optical disk, it is not used in an information recording portion in which high precision is essential. Even if the precision is somewhat low, it does not affect the optical properties of the optical disk. The mold used to produce the resin plate does not need to have a fine uneven pattern, and will be satisfactory as long as it can yield a simple substrate shape. Moreover, production precision need not be very high. Therefore, the production cost of this mold is lower than that of a mold for forming an uneven pattern of the optical disk. For this reason, even when a mold for the cooling device is provided separate from the mold for compression, the production cost does not significantly increase.

(Second Mode)

A second mode of the present invention provides a manufacturing apparatus that is provided with a plurality of molds to efficiently manufacture optical disks.

(Construction)

Figure 10:
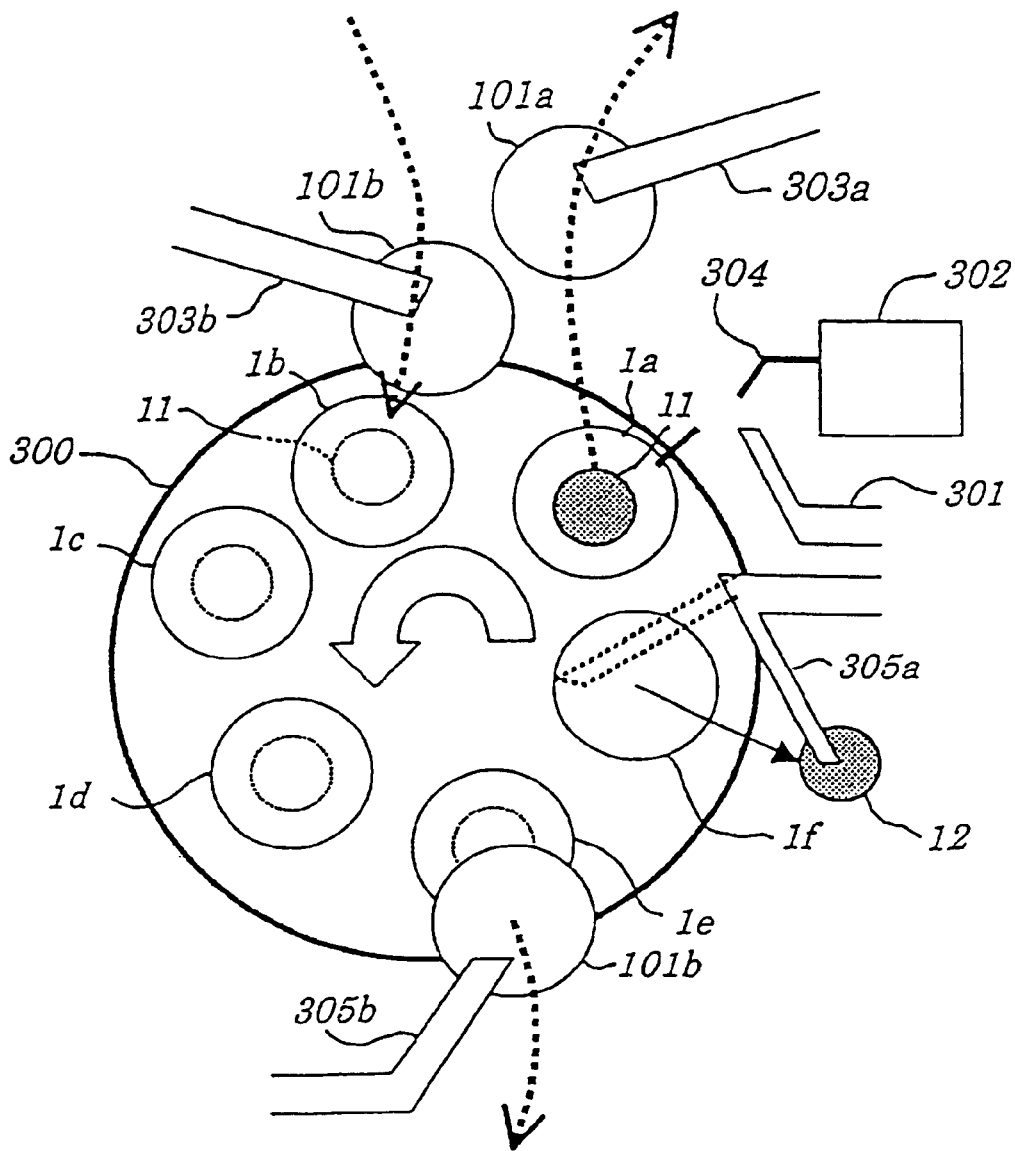
FIG. 10 is a structural view of a substrate producing apparatus according to a second mode.

FIG. 10 is a structural view of the manufacturing apparatus of this mode. As shown in this figure, the manufacturing apparatus comprises a rotary conveyor device 300, a connecting mechanism 301, a resin heating and supplying mechanism 302, a mold switching mechanism 303, a pipe 304, and a removing mechanism 305.

Molds 1a to 1f have a structure similar to that of the first mode, in which an upper mold 101 can be engaged with a lower mold 102. The upper mold 101 includes two types of molds, an upper mold 101a for resin molding, and an upper mold 101b for cooling.

The rotary conveyor device 300 has a structure so as to carry the plurality of molds 1a to 1f and to intermittently turn the molds in a fixed direction (counterclockwise in the figure). The connecting mechanism 301 has a structure similar to the connecting mechanism 107 in the first mode, so as to connect or disconnect the resin heating and supplying device 302 and the mold 1. The resin heating and supplying device 302 and the pipe 304 are similar to the resin heating and supplying device 104 and the pipe 105 in the first mode. The mold switching mechanism 303 comprises an arm 303a for removing the upper mold 101a for resin molding, and an arm 303b for engaging, instead of the upper mold 101a, the upper mold 101b for cooling with the lower mold 102 after resin molding. The removing mechanism 305 comprises an arm 305b for removing the cooling upper mold 101b from the mold 1, and an arm 305a for removing the cooled flat substrate 12 from the mold 1 from which the upper mold 101b has been removed.

While the removal of the upper mold 101a and the mounting of the upper mold 101b by the mold switching mechanism 303, and the removal of the upper mold and the removal of the flat substrate by the removing mechanism 305 are performed at separate positions, they may be performed at the same position.

(Operation)

A description will be given of the process for producing one flat substrate 12 in the above construction of the manufacturing apparatus.

Connecting Step (position of the mold 1a): First, the rotary conveyor device 300 stops at a position such that the pipe 304 of the resin heating and supplying device 302 can be connected to the lower mold 102. The connecting mechanism 301 is driven, and the resin heating and supplying device 302 and the mold 1 are connected in a manner similar to the first mode.

Resin Plate Molding Step (position of the mold 1a): Heated and melted resin 10 is supplied from the resin heating and supplying device 302 into the mold 1. Simultaneously, the arm 303a of the mold switching mechanism 303 conveys the upper mold 101a for resin molding so as to subject the resin 10 to pressure molding.

Upper Mold Removing Step (position of the mold 1a): After the resin plate 11 is molded by shaping the resin 10 in the mold, the arm 303a removes the upper mold 101a.

Conveying Step (from position of the mold 1a to the position of the mold 1b): The rotary conveyor device 300 is driven to convey the mold 1 from which the upper mold 101a has been removed.

Upper Mold Mounting Step (position of the mold 1b): The arm 303 conveys the upper mold 101b for cooling to the conveyed mold 1, and engages the upper mold 101b with the lower mold 102. The resin plate 11 starts to be cooled inside the cavity 106 formed by both the molds (see FIG. 2).

On the other hand, a lower mold 102, which has been newly conveyed to the front of the resin heating and supplying device 302, is connected to the resin heating and supplying device 302 by the connecting mechanism 301, and is supplied with resin.

Cooling Step (from position of the mold 1b to the position of the mold 1e): The rotary conveyor device 300 conveys the mold 1 in which the upper mold 101b is fitted. While one mold is conveyed from the position 1b to the position 1e, the resin plate 11 is sufficiently cooled inside the mold.

Removing Step (position of the mold 1e): The arm 305b of the removing mechanism 305 removes the upper mold 101b from the mold 1 after cooling. When the mold 1 is conveyed to the position of the mold 1f by the rotary conveyor mechanism 300, the arm 305a removes the flat substrate 12 from the lower mold 102.

Onto the removed flat substrate 12, hardening resin is bonded in a bonding process similar to that in the first mode.

The rotary conveyor device 300, the connecting mechanism 301, the resin heating and supplying device 302, the mold switching mechanism 303, and the removing mechanism 305 operate in cooperation with one another. That is, while connection by the connecting mechanism 301 and resin supply by the resin heating and supplying device 302 are being performed at the position of the mold 1a, the arm 303b of the mold switching mechanism 303 operates to engage the upper mold 101b. At the same time, the upper mold 101b is removed by the arm 305b of the removing mechanism 305, and the flat substrate 12 is removed by the arm 305a. While the rotary conveyor device 300 is being driven, other mechanisms stop their operations.

As described above, according to the second mode, when it is assumed that the time, in which the rotary conveyor device stops and resin supply and pressure molding of a resin plate are performed, is designated T, and the number of molds is designated n, it is possible to allocate a time (n−1)T, at maximum, for cooling. Therefore, the manufacturing apparatus of this mode ensures a long cooling time and allows a resin plate to be formed substantially continuously, which can reduce the production time necessary to produce one flat substrate. Since the production time is short, the production cost of an optical disk can be reduced.

(Other modifications)

The present invention is not limited to the above modes, and various modifications may be made.

For example, while the resin plate is cooled by using a separate upper mold in the above modes, it may be cooled by another device capable of cooling, which device need not always be equivalent to the mold for resin plate molding.

While the information recording face is formed of photocuring resin in the above modes, of course, other resins, for example, a thermosetting resin, may be used.

While the optical disk is shaped like a disk in the above modes, it may be formed in other shapes, for example, in the shape of a square IC card.

While the mold device is composed of an upper mold and a lower mold in the above modes, it is not limited to this structure. Other devices may be applied as long as they can mold resin at low pressure and at low temperature.

While the upper molds are exchanged to cool the resin plate in the above modes, other portions, such as lower molds, may be exchanged as long as they form a part of the mold. Furthermore, forcible cooling using a stream of water or the like may be made, instead of cooling with the upper molds exchanged. Still furthermore, cooling may be performed with the same mold.

What is claimed is:

1. An optical recording medium manufacturing method for forming an optical recording medium by hardening a resin between a resin plate and a mold, wherein said resin plate is produced by:
   a heating step for heating thermoplastic resin to a predetermined temperature to be melted;
   a feeding step for feeding said melted thermoplastic resin into said mold;
   a molding step for molding said thermoplastic resin, which has been fed into said mold, into said resin plate by compression at said predetermined temperature and a predetermined pressure; and
   a controlling step wherein said predetermined pressure at which said thermoplastic resin is compressed in said molding step is controlled to be lower than a pressure at which said resin plate deforms due to a reduction in pressure against said resin plate after molding.

2. An optical recording medium manufacturing method according to claim 1, wherein said thermoplastic resin is a resin mainly containing a polyolefin copolymer.

3. An optical recording medium manufacturing method according to claim 1, wherein said predetermined temperature at which said thermoplastic resin is compressed in said molding step is below a temperature at which said thermoplastic resin undergoes oxidation.

4. An optical recording medium manufacturing method according to claim 1, further comprising:
   a cooling step for cooling said molded resin plate after said resin plate is removed from said mold and transferred to another mold.

5. An optical recording medium manufacturing method according to claim 1, further comprising:
   a mold switching step for accelerating a cooling of said resin plate by replacing a part of said mold with another mold after said resin plate is molded.

6. An optical recording medium manufacturing method according to claim 1, further comprising:
   a bonding step for manufacturing said optical recording medium by putting melted hardening resin between said molded resin plate and said template having a predetermined uneven pattern, and by hardening said hardening resin.

7. An optical recording medium manufacturing apparatus for forming an optical recording medium by hardening a hardening resin between a resin plate and a template, said apparatus comprising:
   a mold structured so as to compression-mold thermoplastic resin fed into a cavity;
   a compression molding mechanism for molding said thermoplastic resin by compressing at a predetermined temperature and a predetermined pressure, the compression molding mechanism including a controlling means for controlling the pressure at which the thermoplastic resin is compressed in said mold to be lower than a pressure at which said resin plate deforms due to a reduction in pressure against said resin plate after molding;
   a thermoplastic resin supplying mechanism for feeding said thermoplastic resin into said cavity of said mold; and
   a hardening resin bonding apparatus for manufacturing said optical recording medium by putting melted hardening resin between a resin plate produced by compressing said thermoplastic resin by said mold and said template having a predetermined uneven pattern, and by hardening said hardening resin.

8. An optical recording medium manufacturing apparatus according to claim 7, wherein said thermoplastic resin further comprises a polyolefin copolymer.

9. An optical recording medium manufacturing apparatus according to claim 7 further includes switching mechanism for compressing said thermoplastic resin onto said mold below a temperature at which said thermoplastic resin undergoes oxidation.

10. An optical recording medium manufacturing apparatus according to claim 9, wherein said switching mechanism compresses said thermoplastic resin onto said mold at a pressure lower than a pressure at which said resin plate deforms due to reduction in pressure against said resin plate after molding.

11. An optical recording medium manufacturing apparatus according to claim 7, further comprising:
   another mold for further cooling said resin plate removed from said mold.

12. An optical recording medium manufacturing apparatus according to claim 7, further comprising:

a mold switching mechanism for replacing a part of said mold with said another mold after said resin plate is molded in order to accelerate a cooling of said resin plate.

13. An optical recording medium manufacturing apparatus according to claim 7, further comprising:

a plurality of said molds, a connecting mechanism structured to connect said molds and said thermoplastic resin supplying mechanism;

a mold switching mechanism for replacing a part of said mold with another mold; and a removing mechanism for removing said resin plate from said mold whose part is replaced by another mold;

wherein said connecting mechanism connects said thermoplastic resin supplying mechanism to a mold for producing said resin plate, and disconnects said mold and said thermoplastic resin supplying mechanism after said resin plate is molded in said mold, wherein said mold switching mechanism replaces a part of said mold with another mold after said resin plate is molded, and wherein, after said molded resin plate is cooled in said mold whose part has been replaced, said removing mechanism removes said resin plate from said mold.

14. A method of forming an optical recording medium resin plate comprising:

heating a thermoplastic resin to a temperature where said thermoplastic resin melts;

feeding said thermoplastic resin into a mold; and compression molding said thermoplastic resin into said resin plate at a temperature less than an oxidation temperature of said thermoplastic resin and at a pressure less than a deformation pressure of said resin plate after molding;

wherein said compression molding step includes a controlling step for controlling the pressure at which said thermoplastic resin is compressed in said compression molding step to be less than a pressure at which said resin plate deforms due to reduction in pressure against said resin plate after molding.

15. The method of claim 14 wherein said thermoplastic resin further comprises polyolefin copolymer.

16. The method of claim 14 further comprising replacing a part of a mold used for said compression molding step after said resin plate is molded.

* * * * *